US010394444B2

(12) United States Patent
Higuchi et al.

(10) Patent No.: US 10,394,444 B2
(45) Date of Patent: Aug. 27, 2019

(54) INFORMATION PROCESSING DEVICE (71) Applicant: SONY COMPUTER ENTERTAINMENT INC., Tokyo (JP)

(72) Inventors: Masaki Higuchi, Tokyo (JP); Toru Ogiso, Tokyo (JP); Norihiro Nagai, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 334 days.

(21) Appl. No.: 15/022,304

(22) PCT Filed: Jun. 19, 2014

(86) PCT No.: PCT/JP2014/066364
§ 371 (c)(1),
(2) Date: Mar. 16, 2016

(87) PCT Pub. No.: WO2015/052961
PCT Pub. Date: Apr. 16, 2015

(65) Prior Publication Data
US 2016/0291860 A1 Oct. 6, 2016

(30) Foreign Application Priority Data
Oct. 8, 2013 (JP) .................. 2013-211443

(51) Int. Cl.
G06F 3/0484 (2013.01)
G06F 3/0488 (2013.01)
(Continued)

(52) U.S. Cl.
CPC ...... *G06F 3/04883* (2013.01); *A63F 13/2145* (2014.09); *G06F 3/0485* (2013.01);
(Continued)

(58) Field of Classification Search
CPC ................................... G06F 3/04845
(Continued)

(56) References Cited

U.S. PATENT DOCUMENTS 6,061,062 A * 5/2000 Venolia .................. G06F 3/0481
715/856
6,486,896 B1 * 11/2002 Ubillos ............... G06F 3/04855
715/784

(Continued)

FOREIGN PATENT DOCUMENTS

JP 2010-176575 A 8/2010
JP 2012-521049 A 9/2012
(Continued)

OTHER PUBLICATIONS

International Search Report and Written Opinion dated Sep. 2, 2014, from the corresponding PCT/JP2014/066364.
(Continued)

*Primary Examiner* — Daniel Rodriguez
(74) *Attorney, Agent, or Firm* — Katten Muchin Rosenman LLP (57) ABSTRACT An information processing device having a novel interface for allowing a user to change the reproducing position of a video is provided. The information processing device is connected with a touch sensor (16), receives a drag operation performed by the user in a predetermined direction on the touch sensor (16), changes steplessly the reproducing position of the video in accordance with the amount of the drag operation, and starts to reproduce the video from the changed reproducing position.

8 Claims, 5 Drawing Sheets (51) Int. Cl.
*H04N 21/472* (2011.01)
*G06F 3/0485* (2013.01)
*A63F 13/2145* (2014.01)
*G11B 27/34* (2006.01)
*G11B 27/10* (2006.01)

(52) U.S. Cl.
CPC ........ *G06F 3/0488* (2013.01); *G06F 3/04845* (2013.01); *G06F 3/04855* (2013.01); *G11B 27/102* (2013.01); *G11B 27/34* (2013.01); *H04N 21/47217* (2013.01)

(58) Field of Classification Search
USPC .......................................................... 715/720
See application file for complete search history.

(56) References Cited

U.S. PATENT DOCUMENTS

| | | | | |
|---|---|---|---|---|
| 8,839,193 | B1* | 9/2014 | Devane | G06F 8/35 717/104 |
| 9,363,579 | B2* | 6/2016 | Frumar | G06F 3/04883 |
| 2004/0212636 | A1* | 10/2004 | Stata | G06F 3/04847 715/703 |
| 2005/0040999 | A1* | 2/2005 | Numano | G06F 1/1616 345/1.1 |
| 2005/0179672 | A1* | 8/2005 | Chiu | G06F 3/0213 345/173 |
| 2007/0022159 | A1* | 1/2007 | Zhu | H04L 12/1831 709/204 |
| 2009/0002324 | A1* | 1/2009 | Harbeson | G06F 3/0485 345/173 |
| 2009/0174677 | A1* | 7/2009 | Gehani | G06F 3/04847 345/173 |
| 2009/0322695 | A1* | 12/2009 | Cho | G06F 3/0416 345/173 |
| 2010/0231534 | A1* | 9/2010 | Chaudhri | G06F 3/0481 345/173 |
| 2011/0069012 | A1* | 3/2011 | Martensson | G06F 3/04847 345/173 |
| 2011/0216014 | A1* | 9/2011 | Wu | G06F 3/041 345/173 |
| 2012/0042246 | A1* | 2/2012 | Schwesinger | G06F 3/017 715/716 |
| 2012/0050012 | A1* | 3/2012 | Alsina | H04N 21/4126 340/10.1 |
| 2012/0054612 | A1* | 3/2012 | Bok | G06F 3/0488 715/716 |
| 2012/0131517 | A1* | 5/2012 | Yamamoto | G06F 3/0416 715/863 |
| 2012/0139847 | A1* | 6/2012 | Hunt | G06F 3/0346 345/173 |
| 2012/0179967 | A1* | 7/2012 | Hayes | G06F 3/0484 715/719 |
| 2012/0179970 | A1* | 7/2012 | Hayes | G06F 3/04883 715/722 |
| 2012/0204106 | A1* | 8/2012 | Hill | G06F 3/04883 715/716 |
| 2012/0293456 | A1* | 11/2012 | Ikeda | G06F 1/1626 345/174 |
| 2013/0016910 | A1* | 1/2013 | Murata | H04N 21/4725 382/195 |
| 2013/0067332 | A1* | 3/2013 | Greenwood | G06F 3/0488 715/720 |
| 2013/0154958 | A1* | 6/2013 | Clavin | G06F 1/1626 345/173 |
| 2013/0177294 | A1* | 7/2013 | Kennberg | H04N 21/21805 386/241 |
| 2013/0223812 | A1* | 8/2013 | Rossi | H04N 5/772 386/224 |
| 2013/0311928 | A1* | 11/2013 | Park | G06F 3/04847 715/772 |
| 2014/0129990 | A1* | 5/2014 | Xin | G06F 3/017 715/849 |
| 2014/0267932 | A1* | 9/2014 | Riddell | H04N 5/4403 348/734 |
| 2014/0344765 | A1* | 11/2014 | Hicks | G06F 3/04883 715/863 |
| 2015/0067561 | A1* | 3/2015 | Suzuki | G06F 3/0488 715/767 |

FOREIGN PATENT DOCUMENTS

| | | |
|---|---|---|
| JP | 2012-191544 A | 10/2012 |
| WO | 2012/026730 A2 | 3/2012 |

OTHER PUBLICATIONS

"Oyayubideo (Thumb Video) Do-gugan's iOS apps", [online], Mar. 23, 2012 (Mar. 23, 2012), [retrieval date Aug. 19, 2014 (Aug. 19, 2014), Internet, <URL: https://web.archive.org/web/20120323135019/http://do-gugan.com/iosapps/?page_id=44>. See translation of International Preliminary Report on Patentability for relevance.

International Preliminary Report on Patentability dated Apr. 12, 2016, from the corresponding PCT/JP2014/066364.

* cited by examiner

INFORMATION PROCESSING DEVICE

TECHNICAL FIELD

The present invention relates to an information processing device that changes the reproducing position of a video in accordance with input operations received from a user, a method for controlling such a device, a program for controlling such a device, and an information storage medium for storing such a program.

BACKGROUND ART

There are information processing devices such as Blu-ray (registered trademark) disc players capable of reproducing videos. In making use of such an information processing device, a user may designate the reproducing position of a video using a seek bar, for example, so as to start reproducing the video from halfway through where desired.

SUMMARY

Technical Problem

An object of the present invention is to provide an information processing device that has a novel interface for allowing a user to change the reproducing position of a video, a method for controlling such a device, a program for controlling such a device, and an information storage medium for storing such a program.

Solution to Problem

According to the present invention, there is provided an information processing device connected with a touch sensor. The information processing device includes: an operation receiving section configured to receive a drag operation performed by a user in a predetermined direction on the touch sensor; and a video reproducing section configured to change a reproducing position of a video steplessly in accordance with the amount of the drag operation, before starting to reproduce the video from the changed reproducing position.

According to the present invention, there is further provided a method for controlling an information processing device connected with a touch sensor. The method includes: a step of receiving a drag operation performed by a user in a predetermined direction on the touch sensor; and a step of changing a reproducing position of a video steplessly in accordance with the amount of the drag operation, before starting to reproduce the video from the changed reproducing position.

According to the present invention, there is further provided a program causing an information processing device connected with a touch sensor to function as: an operation receiving section configured to receive a drag operation performed by a user in a predetermined direction on the touch sensor; and a video reproducing section configured to change a reproducing position of a video steplessly in accordance with the amount of the drag operation, before starting to reproduce the video from the changed reproducing position.

According to the present invention, there is further provided a computer-readable information storage medium that stores a program causing an information processing device connected with a touch sensor to function as: an operation receiving section configured to receive a drag operation performed by a user in a predetermined direction on the touch sensor; and a video reproducing section configured to change a reproducing position of a video steplessly in accordance with the amount of the drag operation, before starting to reproduce the video from the changed reproducing position.

DESCRIPTION OF EMBODIMENTS

One embodiment of the present invention is described below in detail with reference to the accompanying drawings.

Figure 1:
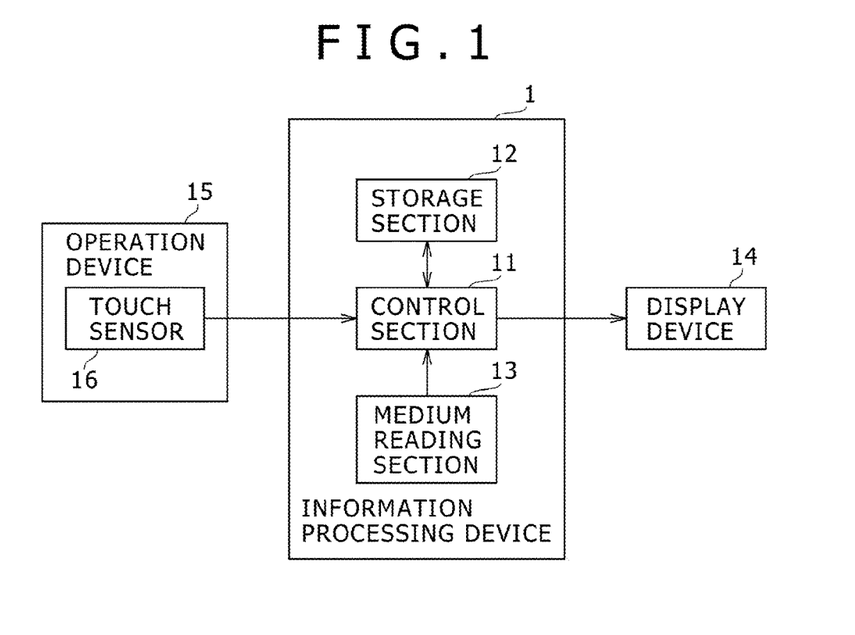
FIG. 1 is a configuration diagram of an information processing device as one embodiment of the present invention.

FIG. 1 is a configuration diagram of an information processing device 1 as one embodiment of the present invention. As shown in FIG. 1, the information processing device 1 is configured to include a control section 11, a storage section 12, and a medium reading section 13. The information processing device 1 is further connected with a display device 14 and an operation device 15. The information processing device 1 may be a home-use game machine or a personal computer, for example. Alternatively, the information processing device 1 may be a handheld game machine or a smartphone formed integrally with the display device 14 and operation device 15. The control section 11 may be a CPU, for example. The control section 11 performs diverse information processing in accordance with programs stored in the storage section 12. The details of the processing performed by the control section 11 in this embodiment will be discussed later. The storage section 12 is configured to include a memory device such as a RAM. The storage section 12 stores the programs executed by the control section 11 as well as the data to be processed by the programs. The medium reading section 13 reads information stored on information storage media such as optical disks. The display device 14 may be a home-use television receiver, for example, which displays a video in accordance with a video signal output from the information processing device 1.

Figure 2:
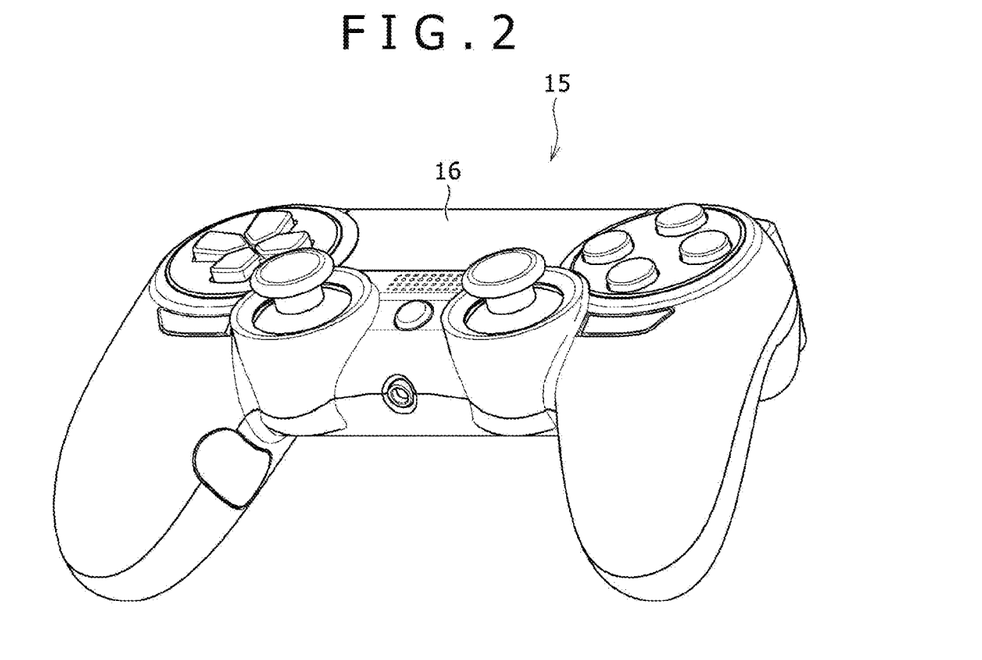
FIG. 2 is a perspective view showing a typical appearance of an operation device.

The operation device 15 may be a controller of the home-use game machine, for example. The operation device 15 receives input operations performed by the user and outputs what is input to the information processing device 1. FIG. 2 shows a typical appearance of the operation device 15. As shown in FIG. 2, the operation device 15 in this embodiment has a touch sensor 16. The touch sensor 16 is a sensor that detects the position of an object placed on its detection surface. The touch sensor 16 may be an electrostatic capacitance type sensor, a pressure-sensitive sensor, or any other suitable type of sensor. The user can perform input operations by touching the detection surface of the touch sensor 16 by a finger or by a stylus. The touch sensor 16 is not limited functionally to detecting only the object as a detection target in contact with the detection surface. The touch sensor 16 may also be arranged to detect the position of the object coming within a predetermined range of detection of the detection surface. In the ensuing description, the user is assumed to perform input operations on the touch sensor 16 by a finger for convenience of explanation.

Figure 3:
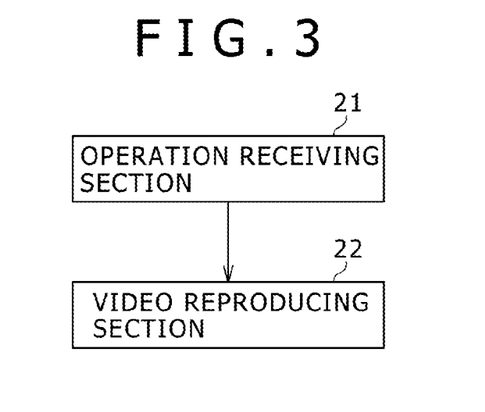
FIG. 3 is a functional block diagram of the information processing device as one embodiment of the present invention.

The functions implemented by the information processing device 1 are described below using the functional block diagram in FIG. 3. As shown in FIG. 3, the information processing device 1 is functionally configured to include an operation receiving section 21 and a video reproducing section 22. These functions are implemented by the control section 11 executing a program stored in the storage section 12. The program, when offered to the information processing device 1, may be stored on any of various information storage media including optical discs or provided via a communication network such as the Internet.

The operation receiving section 21 receives the input operations performed by the user on the operation device 15 and determines the specifics of the operations. The operation receiving section 21 in this embodiment outputs to the video reproducing section 22 the information indicative of the specifics of the input operations received from the user. In a video reproducing process performed by the video reproducing section 22, the user can change the reproducing position of the video by performing a slide operation on the touch sensor 16.

The slide operation is an operation by which the user moves his/her finger in a given direction on the detection surface of the touch sensor 16. The slide operation is of one of two types depending on the time required to complete the operation: a flick operation or a drag operation.

The flick operation is a slide operation performed rapidly in a short time. For example, the operation receiving section 21 determines that a flick operation has been performed when the user's finger has moved on the detection surface at a speed equal to or higher than a predetermined speed. Alternatively, the operation receiving section 21 may determine that the slide operation performed by the user is a flick operation if either or both of two conditions are met in addition to the speed-related condition above: if a detection time of the touch sensor 16 is equal to or shorter than a predetermined time period; and/or if the distance over which the user's finger has moved over the detection surface is longer than a predetermined distance. The detection time of the touch sensor 16 refers to the time period from the time the touch sensor 16 starts detecting the user's finger until the time the touch sensor 16 stops detecting it.

The drag operation is a slide operation that does not meet the conditions for the flick operation. Usually, the drag operation takes longer to complete and is slower to move than the flick operation. When the touch sensor 16 detects an input operation performed by the user, the operation receiving section 21 determines whether the detected operation of the user is a flick operation. Upon determining that the operation is a flick operation, the operation receiving section 21 notifies the video reproduction section 22 of the execution of the flick operation along with information indicative of the direction of the operation (e.g., up, down, right, or left). Upon determining that the operation is not a flick operation but a drag operation, the operation receiving section 21 outputs to the video reproducing section 22 the information indicative of the specifics of the operation (i.e., information designating the time transient of the position being touched by the user's finger).

The video reproducing section 22 is implemented by the control section 11 executing a video reproducing application program. The video reproducing section 22 decodes the video data obtained by the medium reading section 13 through retrieval from the information storage medium, before causing the data to be displayed as images on the screen of the display device 14. Although what is targeted for reproduction in this example is the video data read by the medium reading section 13, this is not limitative of the embodiment. Alternatively, the video reproducing section 22 may target for reproduction the video data received from the outside via the communication network such as the Internet or the video data stored beforehand in the storage section 12.

In reproducing the video, the video reproducing section 22 performs various controls regarding video reproduction in accordance with the specifics of the operations received by the operation receiving section 21. For example, the video reproducing section 22 performs such controls as a start, a stop, a pause, a fast-forward, or a rewind of the video in accordance with the user's pressing operations performed on the buttons of the operation device 15.

Further, halfway through video reproduction, the video reproducing section 22 changes the video reproducing position in accordance with the specifics of the operations received by the operation receiving section 21. In this example, the video reproducing position refers to the position of the object being reproduced in a time sequence from start to end of the video. The reproducing position is defined by elapsed time from the start of reproduction or by a frame number counted starting from the first frame of the video. In the ensuing description, the video reproducing position is assumed to be determined by the elapsed time from the start of reproduction. The video reproducing section 22 changes the current video reproducing position in accordance with the input operations performed by the user, thereby allowing the user to reproduce the video from halfway through where desired.

Described below are some specific process examples in which the video reproducing section 22 changes the video reproducing position. As described above, the video reproducing section 22 changes the video reproducing position in accordance with the input operations performed by the user on the touch sensor 16.

First, if the user performs a flick operation in a rightward or leftward direction during video reproduction, the video reproducing section 22 changes the video reproducing position by a fixed amount C from a position p0 in effect when the flick operation is received. Specifically, suppose that a leftward flick operation is received during video reproduction. The video reproducing section 22 then changes the video reproducing position from the current position p0 to a position that is C seconds earlier (p0−C), and restarts video reproduction from the new position. If a rightward flick operation is received during video reproduction, the video reproducing section 22 changes the video reproducing position from the current position p0 to a position that is C seconds later (p0+C), and restarts video reproduction from the new position. The fixed amount C may be thirty seconds, for example. The fixed amount by which the reproducing position is changed upon leftward flick operation may be different from the fixed amount of change upon rightward flick operation. Also, the video reproducing section 22 may perform the process of changing the reproducing position in accordance with the flick operation not only during video reproduction but also during a pause of video reproduction.

Furthermore, when the user performs a drag operation in the same direction as that of the above-mentioned flick operation, the video reproducing section 22 changes the reproducing position steplessly in accordance with the amount of the drag operation. With this embodiment, the user is assumed to perform a predetermined input operation before carrying out the drag operation. When the predetermined input operation is accepted halfway through video reproduction, the video reproducing section 22 transitions to an operation mode that allows the drag operation to be performed (i.e., drag operation mode). Such a predetermined input operation may be performed on the touch sensor 16. For example, the user may tap any position on the touch sensor 16 or hold down such a position at least for a predetermined time period. This causes the video reproducing section 22 to transition to drag operation mode. The predetermined input operation prevents the reproducing position from being changed accidentally by the user's inadvertent drag operation. In the ensuing description, it is assumed that the video reproducing section 22 transitions to drag operation mode when the user holds down the touch sensor 16 for at least two seconds.

Figure 4:
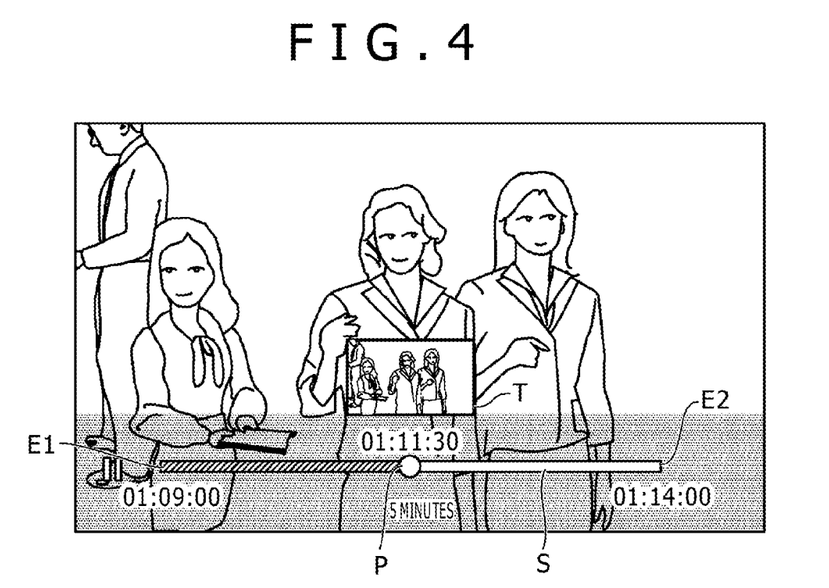
FIG. 4 is a schematic diagram showing a screen display example in drag operation mode.

Following transition to drag operation mode, the video reproducing section 22 stops video reproduction temporarily, and causes the screen of the display device 14 to display a seek bar S corresponding to the reproducing position of the video. The video reproducing section 22 may superimpose the seek bar S onto a video display area of the screen or may display the seek bar S outside the video display area. FIG. 4 shows a screen display example in drag operation mode. In this example, the seek bar S is superimposed on the video display area. A pointer P indicating the current reproducing position is displayed on the seek bar S. Shown above the pointer P is the elapsed time counted from the beginning of video reproduction and indicative of the video reproducing position corresponding to the position of the pointer P.

The direction of the seek bar S coincides with the direction of the drag operation performed by the user to change the reproducing position. With this embodiment, the video reproducing position is changed in accordance with a rightward or leftward drag operation performed on the touch sensor 16, as will be discussed later. In view of this, the seek bar S is arranged crosswise along the screen as shown in FIG. 4.

In drag operation mode, the user may perform a drag operation in the rightward or leftward direction. The drag operation causes the video reproducing section 22 to change the video reproducing position from the position in effect when drag operation mode is entered, by an amount reflecting the amount of the drag operation. Alternatively, after performing the operation on the touch sensor 16 to transition to drag operation mode, the user may keep his/her finger in contact with the touch sensor 16 and proceed to carry out a drag operation to change the reproducing position. In the ensuing description, the reproducing position in effect at the time of transition to drag operation mode will be referred to as an initial position p1, and the reproducing position designated by the user carrying out a drag operation in drag operation mode will be referred to as a designated position p2. The position of the pointer P on the seek bar S corresponds to the designated position p2.

Upon receipt of a drag operation over a migration length L in the leftward direction in drag operation mode, the video reproducing section 22 moves the pointer P to the left by an amount corresponding to the migration length L. At the same time, the video reproducing section 22 changes the designated position p2 from the initial position p1 to a position that is $\alpha L$ earlier ($p1-\alpha L$). Upon receipt of a drag operation in the rightward direction over the migration length L, the video reproducing section 22 moves the pointer P to the right by the amount corresponding to the migration length L. At the same time, the video reproducing section 22 changes the designated position p2 from the initial position p1 to a position that is $\alpha L$ later ($p1+\alpha L$). Here, $\alpha$ is a predetermined coefficient. The coefficient $\alpha$ is determined variably depending on how the seek bar S corresponds to the length of the video reproduction time. Specific corresponding relations between the seek bar S and the video reproduction time will be discussed later.

While the drag operation is being received, the video reproducing section 22 moves the pointer P along the seek bar S in keeping with the drag operation. At the same time, the video reproducing section 22 displays a thumbnail image T above the pointer P. The thumbnail image T is a reduced image of a frame image in the video which corresponds to the designated position p2 at the current point in time. In this manner, the video reproducing section 22 displays the thumbnail image T and updates its content in keeping with the drag operation. This allows the user to change the designated position p2 while checking the scenes of the video desired to be viewed.

The drag operation may be repeated a plurality of times. Where the detection surface of the touch sensor 16 is limited in size, the user may repeat the drag operation in the same direction for a migration length exceeding the detection surface size. This enables the designated position p2 to be changed extensively.

In drag operation mode, as during video reproduction, the video reproducing section 22 may change the designated position p2 in units of the fixed amount C in accordance with rightward or leftward flick operations. When changing the designated position p2 in the direction of the end of the video (i.e., in the fast-forward direction), the user performs a rightward slide operation that may be a flick or drag operation. When changing the designated position p2 in reverse in the direction of the beginning of the video (i.e., in the rewind direction), the user performs a leftward slide operation that may be a flick or drag operation. The user can thus perform both flick and drag operations to change the designated position p2 without becoming aware of any awkwardness.

The video reproducing section 22 ends drag operation mode and returns to ordinary video reproduction mode in one of two cases: if the user performs a predetermined input operation in drag operation mode, or if the user does not perform any input operation for a predetermined time period on the touch sensor 16. The video reproducing section 22 then restarts video reproduction from the designated position p2 in effect when drag operation mode is terminated. This allows the user to view the video starting from the user-designated reproducing position.

Described below are some specific corresponding relations between the seek bar S and the video reproduction time, as well as between the seek bar S and the touch sensor 16.

In the example of FIG. 4, the seek bar S does not correspond to the entire time period from beginning to end of the video. Instead, the seek bar S corresponds to a fixed time period centering on the initial position p1. In the ensuing description, the video reproduction time corresponding to the length of the seek bar S will be referred to as the seek bar corresponding time ST. The seek bar corresponding time ST in this example may be a predetermined time period (e.g., five minutes) or a time period determined in accordance with the duration of the video.

In this example, at the time of transition to drag operation mode, the pointer P is always displayed at the center of the seek bar S as shown in FIG. 4, regardless of the initial position p1 across the entire video. A left end E1 of the seek bar S does not represent the starting position of the video; the left end E1 represents the reproducing position that is earlier by time ST/2 than the initial position p1 (p1−ST/2). Likewise, a right end E2 of the seek bar S does not represent the end position of the video; the right end E2 represents the reproducing position that is later by time ST/2 than the initial position p1 (p1+ST/2). In the example of FIG. 4, the length of the seek bar corresponding time ST (five minutes) is shown under the center point of the seek bar S. Shown under the left end E1 and the right end E2 are the video reproducing positions corresponding to these ends. Specifically in FIG. 4, the initial position p1 is at 01:11:30 (i.e., one hour, eleven minutes, and thirty seconds have elapsed since the start of video reproduction), with the seek bar corresponding time ST assumed to be five minutes. In this case, the left end E1 corresponds to 01:09:00, two minutes and thirty seconds earlier than the initial position p1. The right end E2 corresponds to 01:14:00, two minutes and thirty seconds later than the initial position p1.

The video reproducing section 22 may further change the seek bar corresponding time ST in accordance with the user's predetermined input operation. For example, the touch sensor 16 may receive a slide operation in a direction (up-down direction in this case) intersecting the direction of the drag operation intended to change the reproducing position. The received slide operation causes the video reproducing section 22 to change the seek bar corresponding time ST in steps of a predetermined value. Specifically, the video reproducing section 22 may be caused to change the seek bar corresponding time ST to one of predetermined candidate values (one, five, ten, or thirty minutes) in response to an upward or downward flick operation. One upward flick operation may be performed to increase the seek bar corresponding time ST by one step value; one downward flick operation may be performed to decrease the seek bar corresponding time ST by one step value. In this example, the seek bar corresponding time ST is five minutes at the time of transition to drag operation mode. That means one upward flick operation performed by the user increases the seek bar corresponding time ST to ten minutes. Another upward flick operation increases the seek bar corresponding time ST to thirty minutes. Any further upward flick operation in this state leaves the seek bar corresponding time ST unchanged. A downward flick operation in that state returns the seek bar corresponding time ST to ten minutes. Another two downward flick operations change the seek bar corresponding time ST to one minute. Alternatively, in addition to or in place of the upward or downward flick operations, the video reproducing section 22 may respond to upward or downward drag operations to change the seek bar corresponding time ST in a stepless manner.

As the seek bar corresponding time ST is changed, the amount of change of the designated position p2 is changed correspondingly in response to the drag operation over the migration length L. For example, when the seek bar corresponding time ST is doubled, the amount of change of the designated position P2 is also doubled in response to the drag operation over the same migration length L. That is, the above-mentioned coefficient α is varied in proportion to the change in the seek bar corresponding time ST. Under such a control scheme, the user may lengthen the seek bar corresponding time ST before performing drag operations to change the designated position p2 extensively. The user may also shorten the seek bar corresponding time ST before performing drag operations to change the designated position p2 minutely.

In this example, the seek bar S corresponds not to the entire period from beginning to end of the video but only to a limited time period of the video. However, drag operations can be continued in excess of the range of the seek bar S to change the reproducing position out of the range corresponding to the seek bar S in the initial state. Specifically, after the pointer P has reached the right or left end of the seek bar S following the drag operation, a further drag operation to move the pointer P out of the range of the seek bar S can be received. In that case, the video reproducing section 22 changes only the video reproducing position by the amount of the drag operation while keeping the display position of the pointer P unchanged. In keeping with the changed reproducing position, the content of the thumbnail image T is updated as well. At this point, the display position of the thumbnail image T may be kept fixed to the end of the seek bar S.

Figure 5:
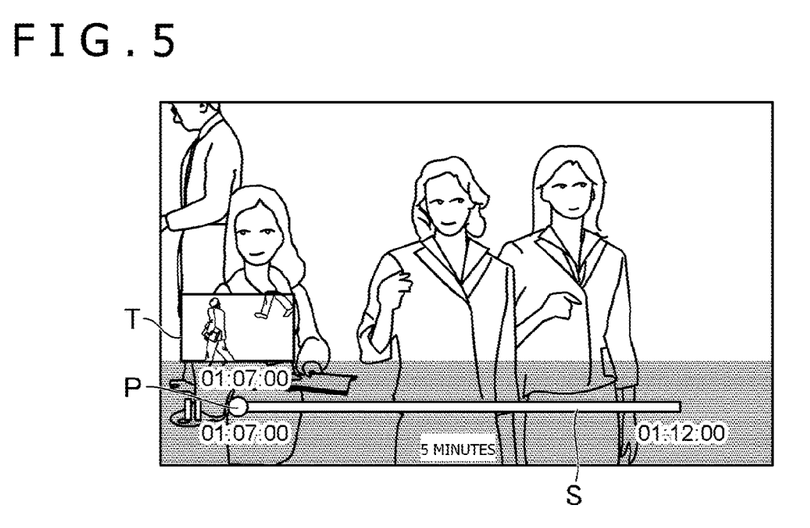
FIG. 5 is a schematic diagram showing a display example in effect when a pointer is moved to one end of a seek bar.

Furthermore, when the reproducing position is to be changed to the outside of the range initially represented by the seek bar S, the video reproducing section 22 may change accordingly the range represented by the seek bar S. For example, the seek bar S at the time of transition to drag operation mode represents the range from the reproducing position (p1−ST/2) to the reproducing position (p1+ST/2), as mentioned above. Given this, suppose that the user continues his/her leftward drag operation even after the pointer P has reached the left end E1 of the seek bar S so that the designated position p2 is changed to a position pz. Here, pz<(p1−ST/2) is satisfied. In this case, the left end E1 of the seek bar S is changed to represent the reproducing position pz, and the right end E2 of the seek bar S is changed to represent a reproducing position (pz+ST). FIG. 5 shows a display example of this state. This drawing indicates how the designated position p2 is changed to a position 01:07:00 exceeding the reproducing position 01:09:00 at the left end E1 of the seek bar S in the initial state. In the example of FIG. 5, the video reproducing section 22 changes the corresponding relation between the seek bar S and the video reproducing position in such a manner that the left end E1 of the seek bar S corresponds to the reproducing position 01:07:00 and the right end E2 corresponds to a reproducing position 01:12:00.

If the seek bar corresponding time ST exceeds the reproduction time of the entire video, the video reproducing section 22 performs control so that the pointer P can be moved only within the range of the video, with the display position of the seek bar S kept unchanged. In this case, the video reproducing section 22 sets the movable range of the pointer P in such a manner that the initial position p1 is also at the center of the seek bar S. Although this leaves the movable range of the pointer P asymmetrical, the user can change the designated position p2 in reference to the reproducing position in effect at the time of transition to drag operation mode.

According to the embodiment described above, the seek bar corresponding time ST at the time of transition to drag operation mode remains constant regardless of the entire reproduction time of the video. That in turn keeps the amount of change of the designated position p2 constant relative to the amount of the drag operation performed by the user. Furthermore, the pointer P is always displayed at the center of the seek bar S regardless of the reproducing position in effect at the time of transition to drag operation mode. This gives the user a constant operational feeling when the user wants to change the reproducing position from the current position to a position a little earlier or later.

A first variation of the embodiment regarding control of drag operation mode is described below. In this variation, the position on the touch sensor 16 corresponds to the position on the seek bar S. It was explained above that the designated position p2 is changed simply in accordance with the direction and the amount of the drag operation, regardless of that position on the touch sensor 16 at which the user has performed the operation. In the first embodiment, by contrast, the position on the detection surface of the touch sensor 16 is arranged to correspond with the position of the pointer P on the seek bar S. Specifically, when the user holds down the touch sensor 16 for transition to drag operation mode, the video reproducing section 22 displays the pointer P at that position on the seek bar S which corresponds to the position of the detection surface being held down. Consequently, unlike in the above-described embodiment, the position at which the pointer P is displayed at the time of transition to drag operation mode may or may not coincide with the center of the seek bar S.

Figure 6:
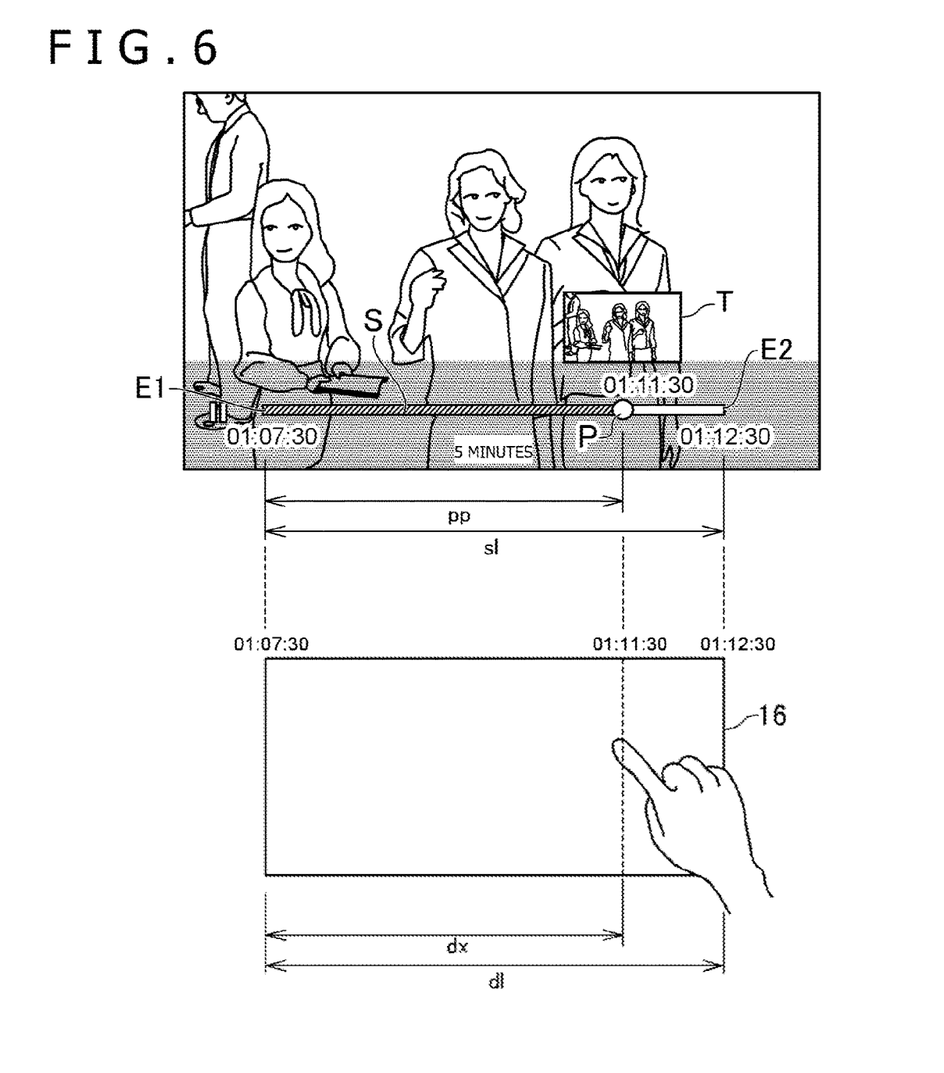
FIG. 6 is a schematic diagram showing the corresponding relation between the seek bar and a detection surface of a touch sensor in a first variation of the embodiment.

FIG. 6 is a schematic diagram showing the corresponding relation between the seek bar S and the detection surface of the touch sensor 16 in the first variation. In FIG. 6, reference symbol dl denotes the crosswise (X-axis direction) length of the detection surface on the touch sensor 16, and reference symbol sl represents the length of the seek bar S displayed on the screen. Also, reference symbol dx denotes the X-axis direction coordinate of the detection surface position held down by the user. A display position pp of the pointer P in this case is determined by a formula pp=(dx/dl)·sl. The pointer P displayed at the display position pp corresponds to the initial position p1 of the video.

Furthermore, the video reproducing positions corresponding to the left end E1 and the right end E2 of the seek bar S are also determined in accordance with the initial position p1 and the display position pp. Specifically in FIG. 6, the display position pp corresponds to 80% of the entire seek bar S as viewed from the left end E1, with the seek bar corresponding time ST set to five minutes. Consequently, the left end E1 corresponds to a reproducing position that is four minutes earlier than the initial position p1. The right end E1 corresponds to a reproducing position that is one minute later than the initial position p1. In this variation, the seek bar S aligns with the crosswise direction of the detection surface. That means the left end and the right end of the detection surface correspond to the left end E1 and the right end E2 of the seek bar S, respectively. When the user performs a drag operation, the video reproducing section 22 moves the pointer P to that position on the seek bar S which corresponds to the position detected on the touch sensor 16 at the end of the drag operation. This enables the user to move the pointer P to any position from the left end E1 to the right end E2 along the seek bar S by a single drag operation started from the position initially held down, while keeping the finger in contact with the detection surface all the time. Since the position detected on the detection surface corresponds to the display position pp of the pointer P on the seek bar S, the user can move the pointer P intuitively to any desired position along the seek bar S.

Figure 7:
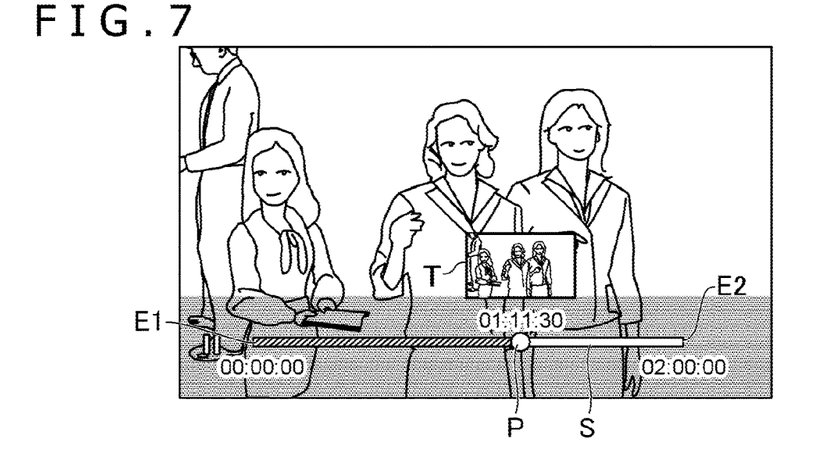
FIG. 7 is a schematic diagram showing a screen display example in a second variation of the embodiment.

A second variation of the embodiment is described below. In this variation, the seek bar S corresponds to the entire reproduction time of the video. It was explained above that the seek bar S corresponds to the seek bar corresponding time ST constituting only part of the entire reproduction time of the video. Alternatively, the seek bar S may correspond to the entire reproduction time of the video. FIG. 7 shows a screen display example in the second variation. In this variation, as shown in FIG. 7, the left end E1 of the seek bar S corresponds to the reproducing start position of the video (elapsed time 0:00:00) and the right end E2 of the seek bar S corresponds to the reproducing end position of the video. In the second variation, regardless of the position at which the user has held down the touch sensor 16, the initial display position of the pointer P is determined by the initial position p1 in effect at the time of transition to drag operation mode.

Figure 8:
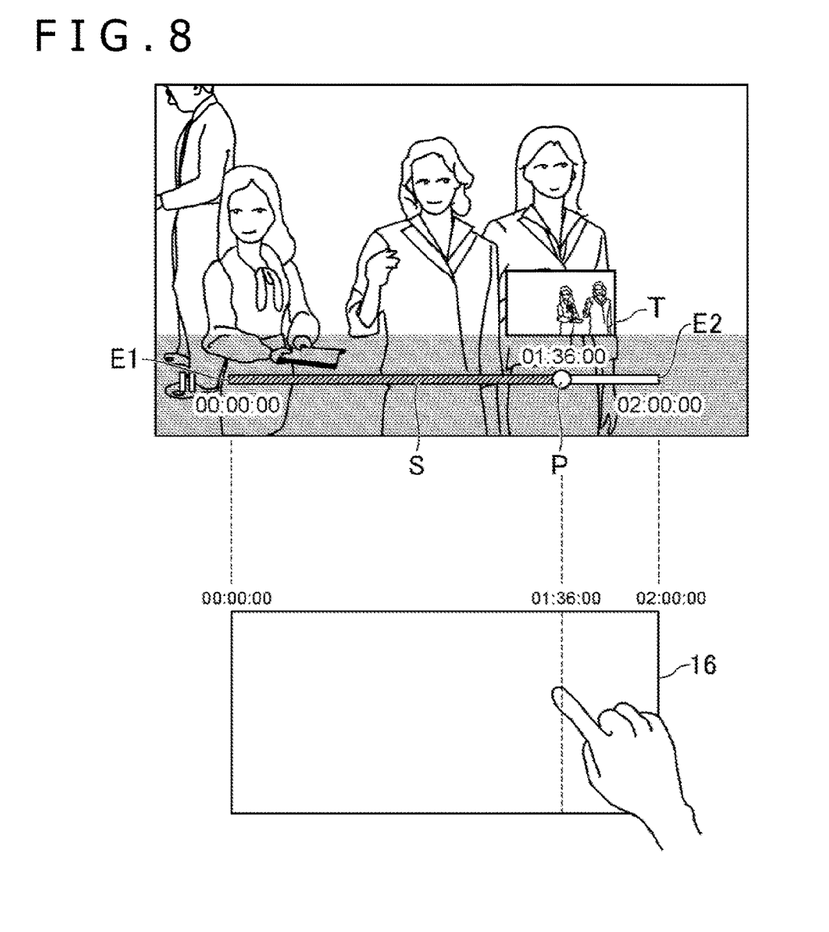
FIG. 8 is a schematic diagram showing the corresponding relation between the seek bar and the detection surface of the touch sensor in a third variation of the embodiment.

A third variation of the embodiment is described below. In this variation, the detection surface of the touch sensor 16 corresponds to the seek bar S that in turn corresponds to the entire reproduction time of the video. The third variation is a combination of the first and the second variations. FIG. 8 shows the corresponding relation between the seek bar S and the detection surface of the touch sensor 16 in the third variation. In this variation, as shown in FIG. 8, the position coordinates in the X-axis direction over the detection surface of the touch sensor 16 correspond to the reproducing positions throughout the entire video on a one-to-one basis. The pointer P is displayed at that position on the seek bar S which corresponds to the position being held down. That is, regardless of the reproducing position at the time of transition to drag operation mode, the reproducing position corresponding to the detection surface position being held down is set as the initial position p1 in the third variation. The third variation allows the user to directly designate the reproducing position desired to be viewed regardless of the current reproducing position. If the position initially held down does not coincide with a desired reproducing position, the designated position p2 can be changed to the desired position by performing a drag operation following transition to drag operation mode.

According to the above-described embodiment of the information processing device of the present invention, the user is allowed to view the video starting from the desired reproducing position changed intuitively by flick and drag operations performed on the touch sensor. In this embodiment, the touch sensor 16 is separated from the screen of the display device 14. Furthermore, the touch sensor 16 is not a touch panel; the touch sensor 16 is configured to have only the detection surface with no display screen. Thus there is no need for the embodiment of the information processing device to always associate the position detected on the touch sensor 16 with the position on the seek bar S as in the first and the third variations described above. This allows the user to change the reproducing position by performing flick and drag operations at any desired position on the touch sensor 16 without a sense of awkwardness.

The embodiment of the present invention is not limited to what was discussed above. For example, although it was explained above that the user changes the video reproducing position by performing flick and drag operations in the crosswise direction, this is not limitative of the present invention. Alternatively, the video reproducing position may be changed by performing flick and drag operations in the up-down direction. In this case, it is preferred that the seek bar S be arranged in the up-down direction on the screen as well. Also in this example, the video reproducing section 22 may change the seek bar corresponding time ST upon receipt of a crosswise flick or drag operation in drag operation mode.

The invention claimed is:

1. An information processing device connected with a touch sensor, comprising:
an operation receiving section configured to receive a drag operation, a flick operation, and a predetermined input operation performed by a user on the touch sensor,
wherein the touch sensor is in wireless communication with the information processing device,
wherein the drag operation, the flick operation, and the predetermined input operation can be performed at any location on the touch sensor, and
a video reproducing section configured to reproduce a video on a display,
wherein the touch sensor is separate from the display,
wherein, upon receipt of the predetermined input operation during reproduction of the video, the video reproducing section stops reproducing the video and transitions to a drag operation mode,
wherein, during the drag operation mode, the user can perform a plurality of flick operations and a plurality of drag operations before the video reproducing section starts to reproduce the video after exiting the drag operation mode,
wherein each drag operation changes a reproducing position of the video steplessly in accordance with an amount of the drag operation, and
wherein each flick operation changes the reproducing position of the video by a fixed amount,
wherein the video reproducing section displays a seek bar corresponding to the video reproducing position on a screen at the time of transition to the drag operation mode,
wherein the video reproducing section displays a pointer at a horizontal position on the seek bar which corresponds to a corresponding horizontal relative position on the touch sensor at which the input operation is performed at the time of transition to the drag operation mode, the pointer being indicative of the video reproducing position at the time of transition to the drag operation mode,
wherein, upon receipt of the drag operation by the operation receiving section, the video reproducing section moves the pointer to a second horizontal position on the seek bar which corresponds to a second corresponding horizontal relative position detected on the touch sensor at the end of the drag operation,
wherein, during the drag operation mode,
a left end of the touch sensor is mapped to a left end of the seek bar, and
a right edge of the touch sensor is mapped to a right end of the seek bar,
wherein a width of the seek bar is less than a width of the display, and wherein the width of the seek bar is mapped to an entire width of the touch sensor.

2. The information processing device according to claim 1,
wherein the video reproducing section ends the drag operation mode when no input operation is performed on the touch sensor for a predetermined time period.

3. The information processing device according to claim 1,
wherein the seek bar corresponds to a predetermined reproduction time regardless of the entire reproduction time of the video.

4. The information processing device according to claim 3,
wherein the video reproducing section displays a pointer at the center of the seek bar, the pointer being indicative of the video reproducing position at the time of transition to the drag operation mode.

5. The information processing device according to claim 3,
wherein, upon receipt by the operation receiving section of a predetermined input operation performed on the touch sensor, the video reproducing section changes the reproduction time corresponding to the seek bar.

6. The information processing device according to claim 5,
wherein, upon receipt by the operation receiving section of a slide operation performed on the touch sensor in a direction intersecting a predetermined direction, the video reproducing section changes the reproduction time corresponding to the seek bar.

7. A method for controlling an information processing device connected with a touch sensor, the method comprising:
receiving a drag operation, a flick operation, or a predetermined input operation performed by a user on the touch sensor,
wherein the touch sensor communicates with the information processing device via a wireless connection,
wherein the drag operation, the flick operation, and the predetermined input operation can be performed at any location on the touch sensor;
reproducing a video on a display,
wherein the touch sensor is separate from the display;
wherein, upon receipt of the predetermined input operation during reproduction of the video, the video is stopped and the information processing device transitions to a drag operation mode,
wherein, during the drag operation mode, the user can perform a plurality of flick operations and a plurality of drag operations before the video is started after exiting the drag operation mode,
wherein each drag operation changes a reproducing position of the video steplessly in accordance with an amount of the drag operation, and
wherein each flick operation changes the reproducing position of the video by a fixed amount;
displaying a seek bar corresponding to the video reproducing position on a screen at the time of transition to the drag operation mode;
displaying a pointer at a horizontal position on the seek bar which corresponds to a corresponding horizontal relative position on the touch sensor at which the input operation is performed at the time of transition to the drag operation mode, the pointer being indicative of the video reproducing position at the time of transition to the drag operation mode; and
moving, upon receipt of the drag operation, the pointer to a second horizontal position on the seek bar which corresponds to a second corresponding horizontal relative position detected on the touch sensor at the end of the drag operation,
wherein, during the drag operation mode,
a left end of the touch sensor is mapped to a left end of the seek bar, and a right edge of the touch sensor is mapped to a right end of the seek bar, wherein a width of the seek bar is less than a width of the display, and wherein the width of the seek bar is mapped to an entire width of the touch sensor.

8. A non-transitory computer readable medium having stored thereon a program for an information processing device connected with a touch sensor, the program comprising:

by an operation receiving section, receiving a drag operation, a flick operation, or a predetermined input operation performed by a user on the touch sensor, wherein the touch sensor communicates with the information processing device via a wireless connection, wherein the drag operation, the flick operation, and the predetermined input operation can be performed at any location on the touch sensor; and by a video reproducing section, to reproduce a video on a display, wherein the touch sensor is separate from the display, wherein, upon receipt of the predetermined input operation during reproduction of the video, the video reproducing section stops reproducing the video and transitions to a drag operation mode, wherein, during the drag operation mode, the user can perform a plurality of flick operations and a plurality of drag operations before the video reproducing section starts to reproduce the video after exiting the drag operation mode, wherein each drag operation changes a reproducing position of the video steplessly in accordance with an amount of the drag operation, and wherein each flick operation changes the reproducing position of the video by a fixed amount, wherein the video reproducing section displays a seek bar corresponding to the video reproducing position on a screen at the time of transition to the drag operation mode, wherein the video reproducing section displays a pointer at a horizontal position on the seek bar which corresponds to a corresponding horizontal relative position on the touch sensor at which the input operation is performed at the time of transition to the drag operation mode, the pointer being indicative of the video reproducing position at the time of transition to the drag operation mode, wherein, upon receipt of the drag operation by the operation receiving section, the video reproducing section moves the pointer to a second horizontal position on the seek bar which corresponds to a second corresponding horizontal relative position detected on the touch sensor at the end of the drag operation, wherein, during the drag operation mode,
a left end of the touch sensor is mapped to a left end of the seek bar, and
a right edge of the touch sensor is mapped to a right end of the seek bar, wherein a width of the seek bar is less than a width of the display, and wherein the width of the seek bar is mapped to an entire width of the touch sensor.

* * * * *